United States Patent
Chen

(10) Patent No.: US 8,319,895 B2
(45) Date of Patent: Nov. 27, 2012

(54) SIGNAL DETECTION METHOD

(75) Inventor: Min-Jye Chen, Miaoli (TW)

(73) Assignee: Qisda Corporation, Taoyuan County (TW)

( * ) Notice: Subject to any disclaimer, the term of this patent is extended or adjusted under 35 U.S.C. 154(b) by 1174 days.

(21) Appl. No.: 12/016,634

(22) Filed: Jan. 18, 2008

(65) Prior Publication Data

US 2008/0174698 A1    Jul. 24, 2008

(30) Foreign Application Priority Data

Jan. 18, 2007  (TW) ................................ 96101896 A

(51) Int. Cl.
*H04N 5/46* (2006.01)

(52) U.S. Cl. ........ 348/558; 348/571; 348/555; 348/705; 710/19; 706/10

(58) Field of Classification Search .......... 348/552–555, 348/558, 571, 705, 706; 710/15–19; 706/10
See application file for complete search history.

(56) References Cited

U.S. PATENT DOCUMENTS

| 6,591,314 B1* | 7/2003 | Colbath | 710/36 |
| 2008/0062328 A1* | 3/2008 | Bilbrey | 348/705 |

* cited by examiner

*Primary Examiner* — Brian Pendleton
*Assistant Examiner* — Nnenna Ekpo

(57) ABSTRACT

A signal detection method is provided. The signal detection method for an electronic device having a plurality of terminals to receive signals from a plurality of sources corresponding to the terminals, includes the following steps: providing a sequence index for each terminal; providing a plurality of weighting numbers for the electronic device; comparing the sequence indexes of the terminals to determine a terminal detection sequence when the electronic device is turned on or the signal source changes; detecting the terminals according to the detection sequence; adding one of the weighting number to the sequence index of the terminal with signal traffic. The detection sequence begins at the terminal with a largest sequence index and ends at the terminal with a smallest sequence index.

18 Claims, 5 Drawing Sheets

SIGNAL DETECTION METHOD

BACKGROUND OF THE INVENTION

1. Field of the Invention

The invention relates to a signal detection method, and more particularly to a method of determining the sequence of detected signals.

2. Description of the Related Art

A liquid crystal display may have many signal sources, such as analog signals (D-SUB), digital signals, video signals and various other signals. A conventional liquid crystal display must detect terminals for different signal sources one-by-one to determine which terminal is conducting signals and for receiving the signals when the liquid crystal display is turned on. The signal detection is performed manually or automatically in the conventional liquid crystal display.

A conventional manual signal detection method is shown in FIG. 1. When the liquid crystal display is turned on, the liquid crystal display is manually switched to a desired terminal, for example to a D-SUB terminal as shown in step 101 of FIG. 1, to a DVI terminal as shown in step 102, or to an S-video terminal as shown in Step 103. Steps 104 and 105 of FIG. 1 show the manual switch to other two terminals. In spite of the fast and direct operation of the manual switch, human intervention is required.

A conventional automatic signal detection method is shown in FIG. 2. When the liquid crystal display is turned on, the terminals of the liquid crystal display are detected automatically one-by-one to determine the terminal conducting signals as shown in step 201 of FIG. 2. When signals at one terminal are detected, the liquid crystal display is switched automatically to the terminal, for example to the D-SUB terminal as shown in step 202. Note that when the detected signals are unstable, the liquid crystal display detects the terminal with signal traffic periodically as shown in step 203 until the signals are stable. When the signals are interrupted, the automatic detection is resumed. Although automatic detection is convenient, detecting terminals one-by-one is time consuming.

BRIEF SUMMARY OF INVENTION

A signal detection method for an electronic device is provided. An exemplary embodiment of an electronic device comprises a plurality of terminals receiving signals from a plurality of sources corresponding to the terminals. An exemplary embodiment of the signal detection method for an electronic device comprises: providing a sequence index for each terminal; providing a plurality of weighting numbers for the electronic device; comparing the sequence indexes of the terminals to determine a terminal detection sequence when the electronic device is turned on or the signal source changes; detecting the terminals according the detection sequence; adding one of the weighting numbers to the sequence index of the terminal with signal traffic. The detection sequence begins at the terminal with the largest sequence index and ends at the terminal with the smallest sequence index.

The weighting numbers comprise a first weighting number, a second weighting number and a third weighting number. The first weighting number is added to the sequence index of the terminal with signal traffic. The second weighting number is added to the sequence index of the terminal without signal traffic but connected to a corresponding source. The third weighting number is added to the sequence index of the terminal not connected to a corresponding source. When the electronic device is turned on or the signal source changes, the electronic device detects the terminals connected or not connected corresponding sources to add the second weighting number or the third weighting number to the sequence index.

The signal detection method of the invention further comprises the following steps: comparing all sequence indexes to determine whether all sequence indexes are identical; selecting one of the terminals arbitrarily to begin detection when all sequence indexes of the terminals are identical.

The signal detection method of the invention further comprises the following steps: selecting manual or automatic addition of the weighting numbers to the sequence index when the electronic device is turned on or the signal source changes; determining the detection sequence according the sequence indexes when manual addition is selected.

The signal detection method of the invention further comprises the following steps: determining whether one of the terminals is selected directly and providing signals to the selected terminal when the electronic device is turned on or the signal source changes; determining whether manual or automatic addition of the weighting numbers to the sequence index of the selected terminal is selected when one terminal is selected; adding the weighting numbers to the sequence indexes of the terminals automatically when automatic addition is selected.

The signal detection method of the invention further comprises the following steps: determining whether manual or automatic addition of the weighting numbers to the sequence index of the terminals is selected when no terminal is selected; determining the detection sequence according the sequence indexes when manual addition is selected.

The terminals comprise an analog signal terminal, a digital signal terminal and a video signal terminal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
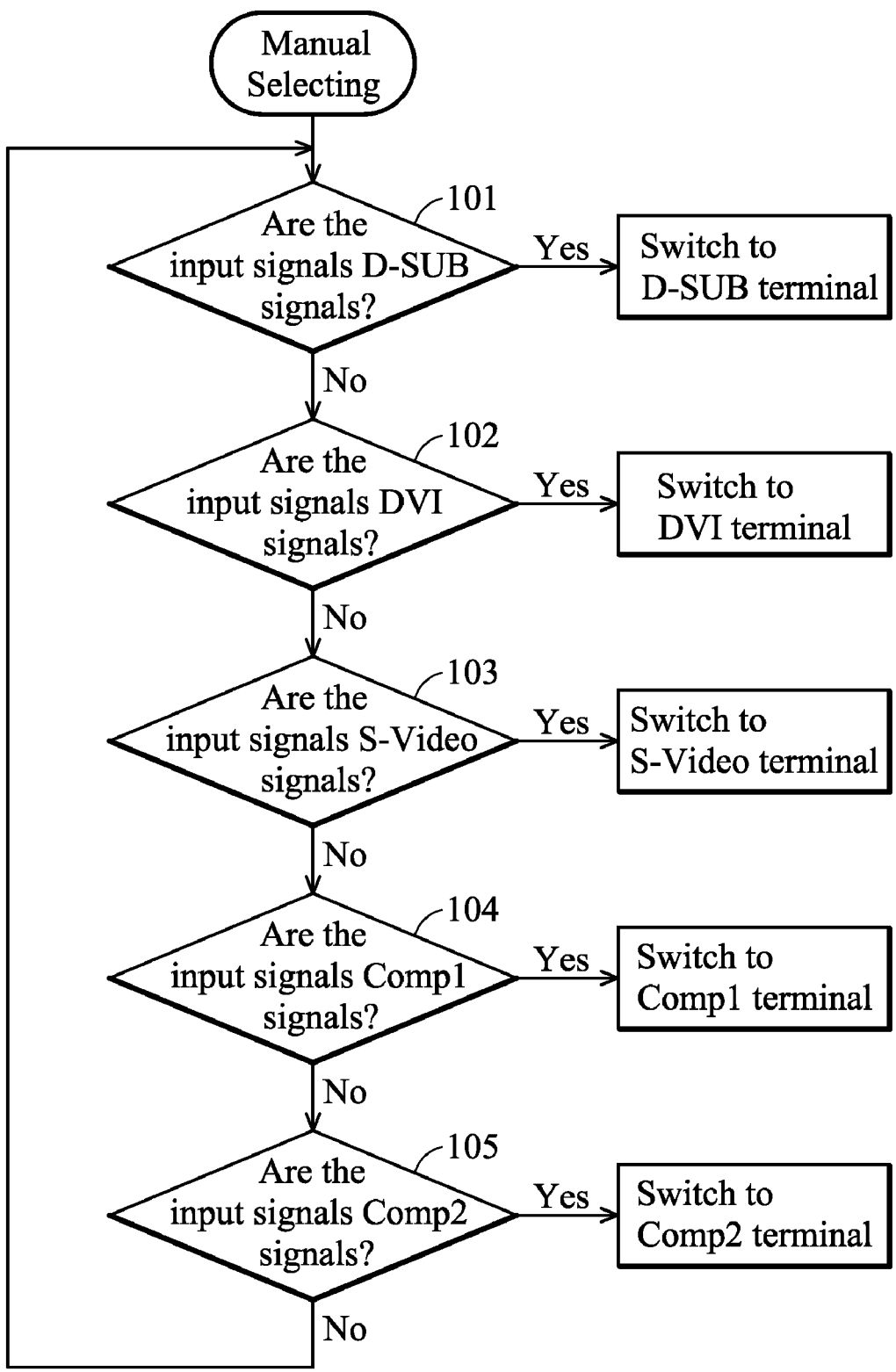
FIG. 1 is a flow chart of a conventional manual signal detection method.

The invention provides a signal detection method determining the detection sequence of terminals of an electronic device, such as D-SUB, DVI, S-Video terminals and similar. A liquid crystal display is described the following, but the electronic device is not limited to a liquid crystal display. The invention is also applicable to other electronic devices with multiple terminals. Several weighting numbers determine the detection sequence. In general, the most frequently used terminal is detected prior to the least used terminal, thus detection time is reduced. The weighting numbers, therefore, represent the frequency of usage. Certainly, the detection sequence may be determined by certain factors other than the frequency of usage, depending on requirements.

There are three possible detection results for a terminal. The terminal is connected to a source by a wired or wireless connection for receiving signal. The terminal is connected to a source by a wired or wireless connection but receives no signals. The terminal is not connected to a source. The weighting numbers are defined according to the three possible detection results.

The weighting numbers comprise a first weighting number $D1$, a second weighting number $D2$ and a third weighting number $D3$. The first weighting number $D1$ indicates that a terminal is connected to a source by a wired or wireless connection and receives signals. The second weighting number $D2$ indicates that a terminal is connected to a source by a wired or wireless connection but receives no signal. The third weighting number $D3$ indicates that a terminal is not connected to a source. Because the most frequently used terminal is detected prior to the least used terminal, the first weighting number is greater than the second weighting number and the second weighting number is greater than the third weighting number, $D1>D2>D3$.

Although three terminals, a first terminal, a second terminal and a third terminal, are described in the embodiment, the invention is not limited to three terminals. The invention is also applicable to an electronic device with more than three terminals.

Each terminal is provided with a sequence index by the electronic device. The sequence index of the first terminal, the second terminal and the third terminal is $W1$, $W2$ and $W3$.

When the electronic device is turned on, each terminal is detected to determine whether the terminal is connected to a source to determine if the first weighting number $D1$, the second weighting number $D2$ or the third weighting number $D3$ is added to the sequence indexes $W1$, $W2$ and $W3$. For example, when it is detected that the second terminal is connected to a source and receives signals, the first weighting number $D1$ is added to the sequence index of the second terminal $W2$. Thus, the weighting numbers $D1$, $D2$ and $D3$ are added to the sequence index of each terminal respectively according to the detection result. When the electronic device turns off and on again or is turned on, the sequence indexes $W1$, $W2$ and $W3$ may be different.

When the electronic device is turned on, the sequence indexes are compared with one another to determine the detection sequence. The larger the sequence index is, the earlier the corresponding terminal is detected. For example, the sequence indexes of the first, second and third terminals are compared. If the sequence indexes are identical, i.e., $W1=W2=W3$, the electronic device selects one of the terminals arbitrarily to begin the detection. If the sequence indexes are not identical, such as $W1>W2>W3$, the electronic device detects the first terminal, then the second terminal and finally the third terminal.

When the electronic device detects signals at a terminal, the first weighting number $D1$ is added to the sequence index of the terminal receiving signals. For example, when signals are detected at the second terminal, the first weighting number $D1$ is added to the sequence index $W2$. When the electronic device turns off and on again, the updated sequence index $W2$ is compared with the other sequence indexes.

In addition to the weighting numbers automatically being added to the sequence indexes according to the detection results (referred to in the following as auto-weighting), the weighting numbers can also be added to the sequence indexes manually (referred to in the following as manual weighting). The signal detection method of the invention is described with reference to the accompanying flow chart.

Figure 2:
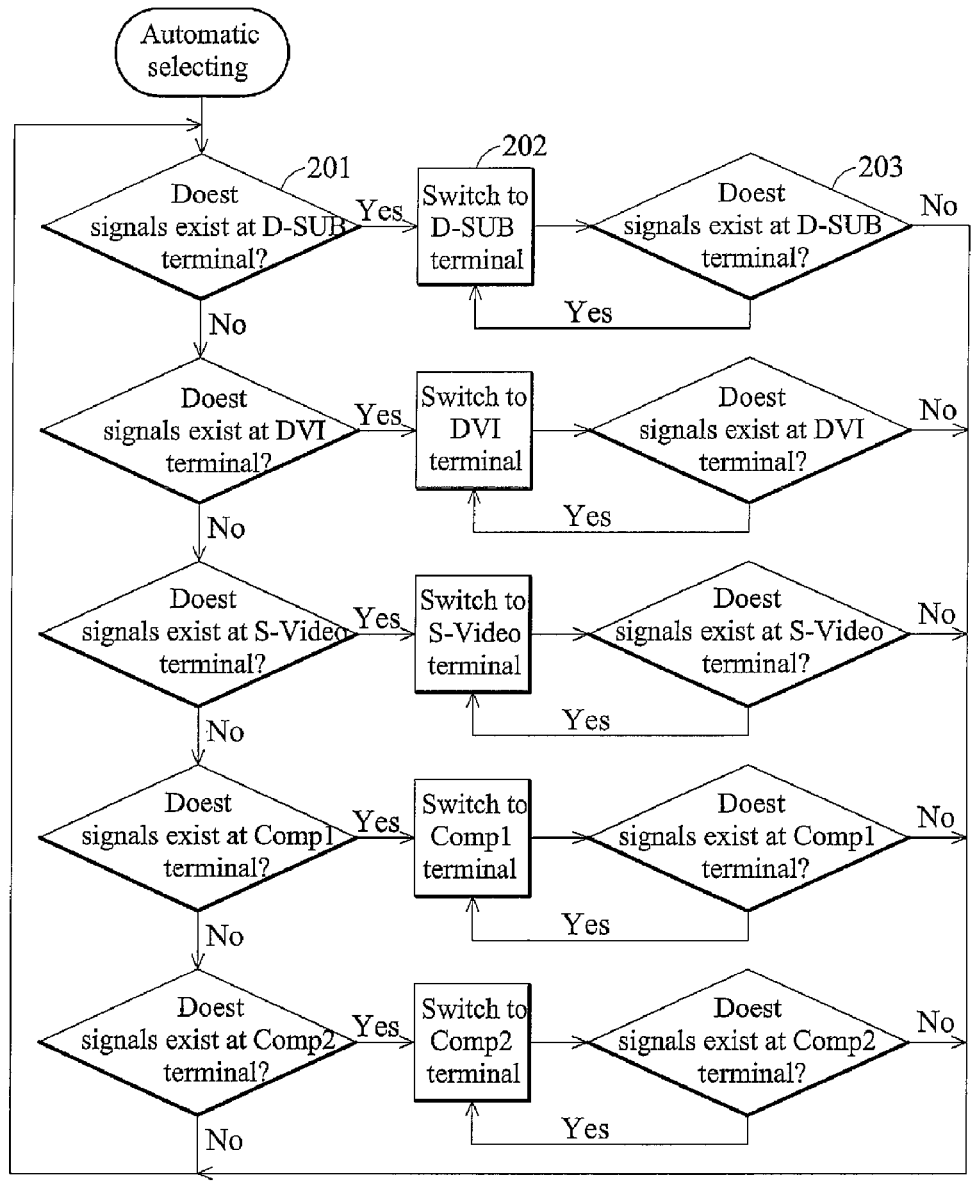
FIG. 2 is a flow chart of a conventional automatic signal detection method.
Figure 3A:
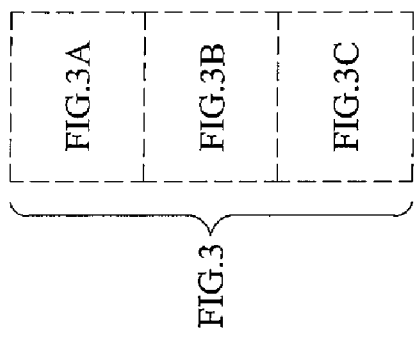
FIG. 3 is a flow chart of a signal detection method of the invention.
Figure 3A:
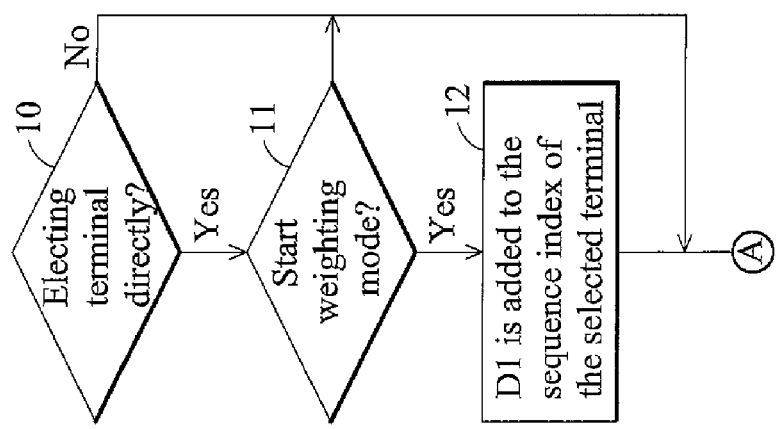
Figure 3B:
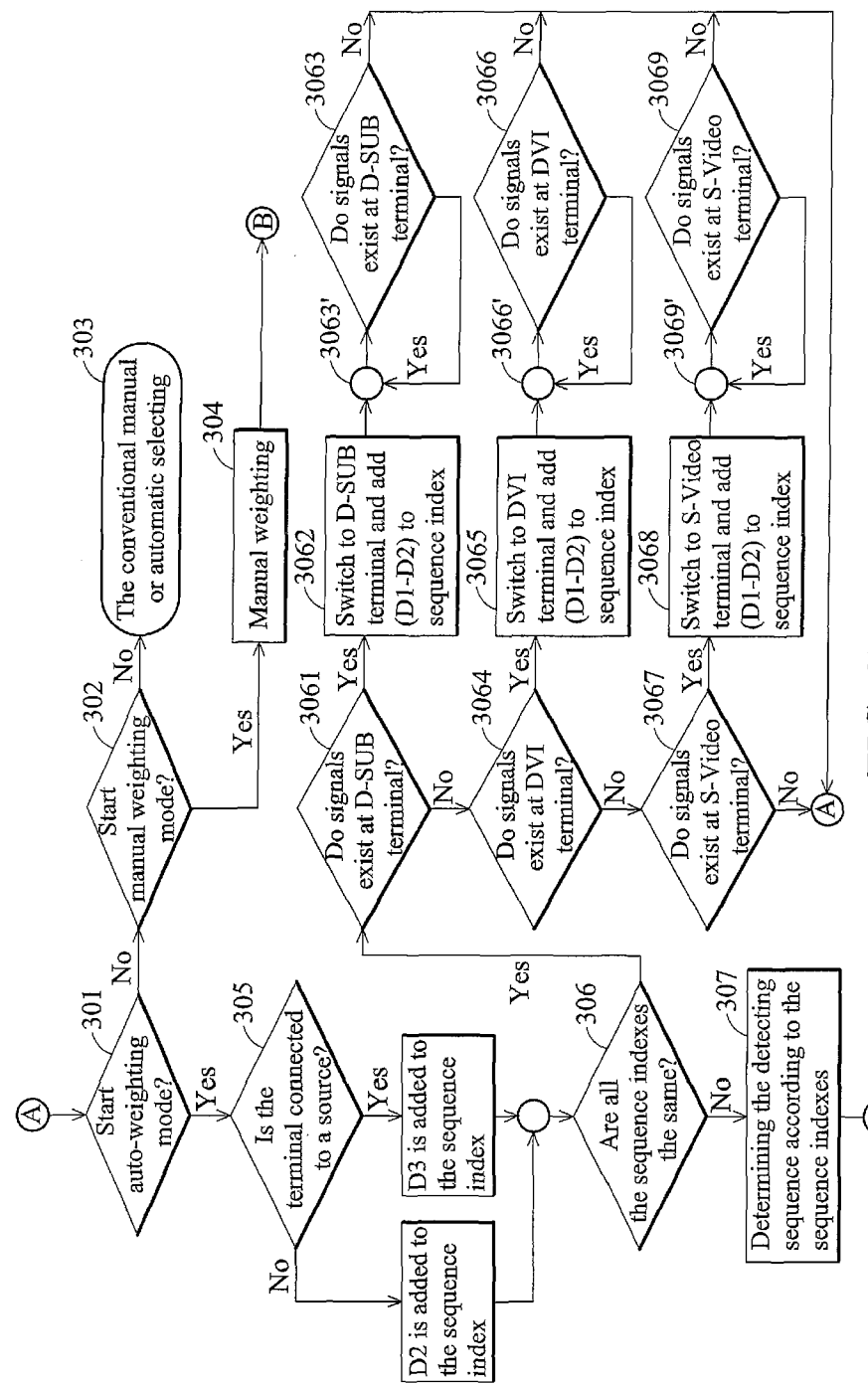
Figure 3C:
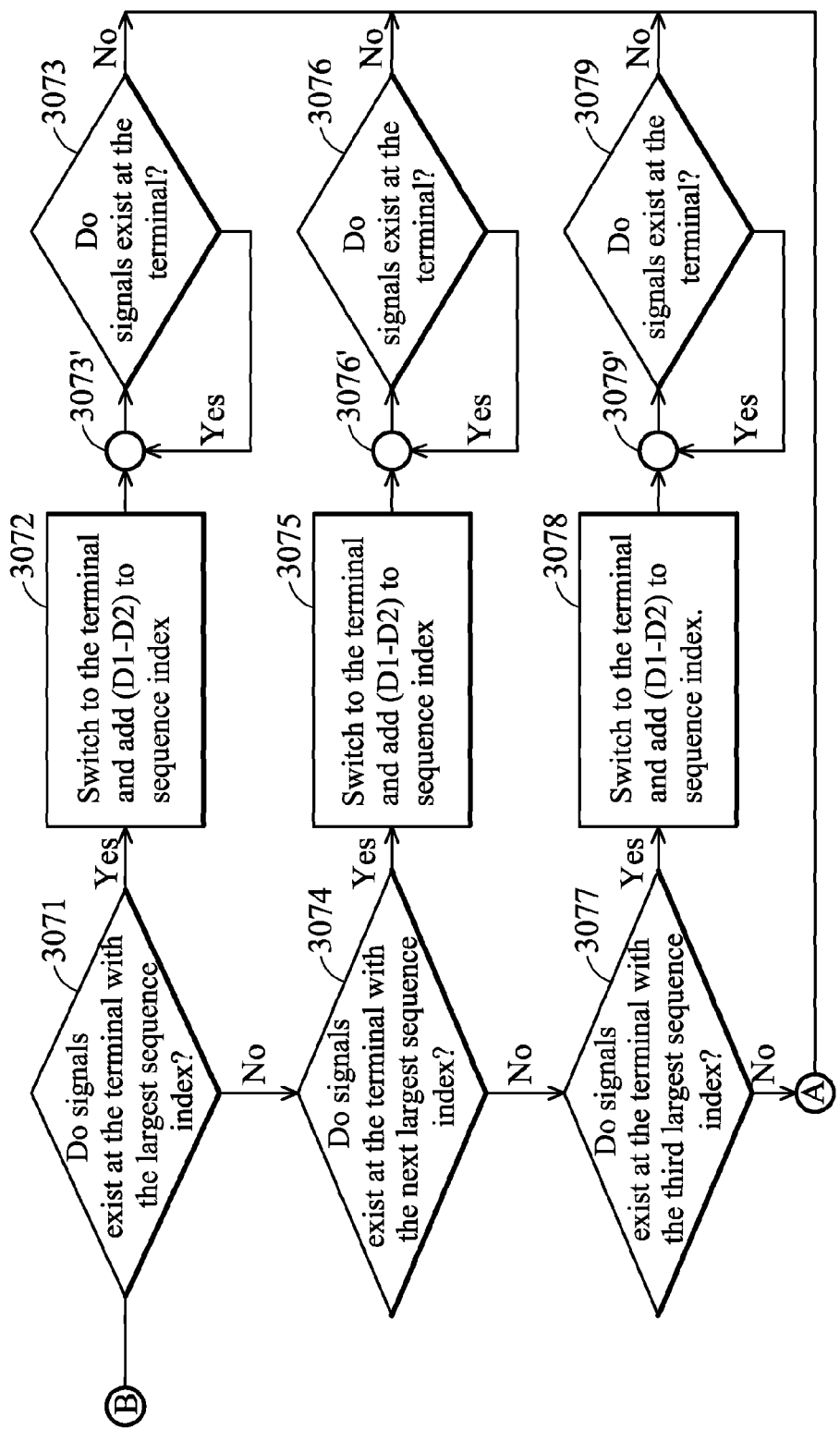

FIG. 3 is a flow chart of the signal detection method of the invention. For brevity, the entire procedure is divided into procedure A and procedure B. Procedure A is executed prior to detection. Procedure B is the signal detection procedure according to sequence index after turning off and on of the electronic device or signal interruption. In step 301, the auto-weighting function is selected. If the auto-weighting function is not selected, step 302 where the manual weighting is selected proceeds. If manual weighting is not selected, one of the conventional signal detection methods (the automatic or manual methods as shown in FIGS. 1 and 2) is executed, as shown in step 303. If the manual weighting is selected, step 304 proceeds for manual weighting, and procedure B where the terminal with the largest sequence index is detected first as shown in step 3071 proceeds. If signal traffic is present at the terminal, step 3072 proceeds, wherein the electronic device switches to the terminal and adds the first weighting number $D1$ to the sequence index of the terminal. When signals are detected but unstable, the electronic device periodically redetects the terminal until a stable signal is detected, as shown in step 3073', but the weighting number is not added to the sequence index. If the signals are interrupted, method returns to procedure A.

In step 301, if auto-weighting is selected, step 305 proceeds, wherein the second weighting number or the third weighting number is added by the electronic device to the sequence index according to the source connection of the terminal. When the connection is detected, the third weighting number $D3$ is added to the sequence index. When no connection is detected, the second weighting number $D2$ is added to the sequence index.

In step 306, the sequence indexes of all terminals are compared. If all of the sequence indexes are identical, step 3061 proceeds, wherein one terminal is selected arbitrarily to begin detection. In this embodiment, the liquid crystal display first detects the D-SUB terminal. If signal traffic is present at the D-SUB terminal, step 3062 proceeds, wherein the liquid crystal display is switched to the D-SUB terminal to receive signals, and the difference of the first weighting number and the second weighting number $(D1-D2)$ are added to the sequence index. Because step 3062 is the same as step 3072, the description of step 3062 is omitted. If no signal traffic is present at the D-SUB terminal, step 3064 proceeds, wherein the terminal (DVI terminal) is detected. If signal traffic is present at the DVI terminal, step 3065 proceeds, wherein the liquid crystal display switches to the DVI terminal and the difference of the first weighting number and the second weighting number $(D1-D2)$ is added to the sequence index. Because step 3066 is the same as step 3063, further description is omitted. Similarly, if no signal is detected at the DVI terminal, step 3067 proceeds, wherein the terminal (S-Video terminal) is detected. If signals are detected at the terminal S-Video, step 3068 proceeds, wherein the electronic device switches to the S-Video terminal and the sequence index of the S-Video terminal is added by difference of the first weighting number and the second weighting number $(D1-D2)$. Because step 3069 is the same as step 3063, the description is omitted.

If the sequence indexes of the terminals are not identical, step 307 proceeds, wherein the detection sequence is determined by the value of the sequence index. Procedure B is then executed. The terminal with the largest sequence index is detected, as shown in step 3071. If signals are detected at the terminal, step 3072 proceeds, wherein the electronic device switches to the terminal and the difference of the first and second weighting numbers $(D1-D2)$ is added to the sequence index. If no signals are detected at the terminal with the largest sequence index, then the terminal with the next largest sequence index is detected, as shown in step 3074. If signals are detected at the terminal with the next largest sequence index, then the electronic device switches to the terminal and the difference of the first and second weighting numbers (D1-D2) is added to the sequence index, as shown in step 3075. Step 3076 is the same as step 3073. In step 3077, the terminal with the third largest sequence index is detected. If signals are detected at the terminal, step 3078 proceeds, wherein the difference of the first and second weighting numbers (D1-D2) is added to the sequence index. Step 3079 is the same as step 3073.

Prior to procedure A, a function allowing a terminal to be user pre-selected is added, as shown in step 10. The function can be selected from on an screen display (OSD) menu. If the function is not selected, procedure A is entered directly. If users select the function, step 11 proceeds to determine whether the first weighting number D1 is added to the sequence index of the selected terminal. If no weighting number is to be added to the sequence index of the selected terminal, procedure A is entered directly. If a weighting number is to be added to the sequence index of the selected terminal, step 12 proceeds, wherein the first weighting number is added to the sequence index of the selected terminal, procedure A then proceeds.

In the invention, the weighting numbers D1, D2 and D3 are applied to all terminals. In some embodiments, each terminal has its own weighting number different from the other terminals. Two terminals, a first terminal and a second terminal, are described here as an example, but the invention is not limited to two terminals. The sequence index of the first terminal is W1, and the sequence index of the second terminal is W2. The weighting numbers applied to the first terminal comprise a first weighting number C1, a second weighting number C2, a fifth weighting number C5 and a seventh weighting number C7. The weighting numbers applied to the second terminal comprise a third weighting number C3, a fourth weighting number C4, a sixth weighting number C6 and a eighth weighting number C8. The first weighting number C1 indicates that the first terminal is connected to a first source and signals are detected at the first terminal. The second weighting number C2 indicates that no signals are detected at the first terminal. The third weighting number C3 indicates that the second terminal is connected to a second source and signals are detected at the second terminal. The fourth weighting number C4 indicates that no signal is detected at the second terminal. If no signal is detected at the first or second terminal, two conditions are possible: the terminal is connected to a source and receives no signal, or the terminal is not connected to a source. The fifth weighting number C5 indicates that the first terminal is connected to the first source and receives no signal. The sixth weighting number C6 indicates that the second terminal is connected to the second source and receives no signal. The seventh weighting number C7 indicates that the first terminal is not connected to the first source. The eighth weighting number C8 indicates that the second terminal is not connected to the second source. In this embodiment, C1>C2, C1>C4, C3>C2, C3>C4.

When signals are detected at the first terminal, the first weighting number C1 is added to W1. When the first terminal is connected to the first source but and receives no signal, the fifth weighting number C5 is added to W1. When the first terminal is not connected to the first source, the seventh weighting number C7 is added to W1.

When signals are detected at the second terminal, the third weighting number C3 is added to W2. When the second terminal is connected to the second source and receives no signal, the sixth weighting number C6 is added to W2. When the second terminal is not connected to the second source, the eighth weighting number C8 is added to W2.

When signals are detected at the second terminal, the third weighting number C3 is added to W2. When the second terminal is connected to the second source but receives no signals, the sixth weighting number C6 is added to W2. When the second terminal is not connected to the second source, the eighth weighting number C8 is added to W2.

As described, the first terminal has weighting numbers different from the second terminal. The weighting numbers of the first terminal are greater than the weighting numbers of the second terminal, such as C1>C3, C1=15, C3=10. The value added to W2 three times by the third weighting number C3 is equal to the value added to W1 twice by the first weighting number C1, which means the first terminal is more advantageous than the second terminal.

Except for the weighting numbers for each terminal, other procedures are identical to procedures as previously described. The terminals are detected according to the value of the sequence index.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A signal detection method for an electronic device comprising a plurality of terminals to receive signals from a plurality of sources corresponding to the terminals, comprising the following steps:
    providing a sequence index for each terminal;
    providing a plurality of weighting numbers for the electronic device;
    comparing the sequence indexes of the terminals to determine a detection sequence when the electronic device is turned on or the sources change;
    detecting the terminals according to the detection sequence;
    adding one of the weighting numbers to the sequence index of the terminal with signal traffic;
    wherein the detection sequence begins at the terminal with a largest sequence index and ends at the terminal with a smallest sequence index; and
    wherein the weighting numbers comprise a first weighting number added to the sequence index of the terminal with the signal traffic, a second weighting number added to the sequence index of the terminal without the signal traffic but connected to a corresponding source, and a third weighting number added to the sequence index of the terminal not connected to a corresponding source.

2. The signal detection method as claimed in claim 1, wherein when the electronic device is turned on or the sources change, the electronic device detects the terminals connected or not connected to the corresponding sources to add the second weighting number or the third weighting number to the sequence index.

3. The signal detection method as claimed in claim 1, wherein the weighting numbers further comprise a fourth weighting number added to the sequence index according to a utilization period of the terminal.

4. The signal detection method as claimed in claim 1 further comprising the following steps:
    selecting manual or automatic addition of the weighting numbers to the sequence index when the electronic device is turned on or the sources change; and
    determining the detection sequence according to the sequence indexes when manual addition is selected.

5. The signal detection method as claimed in claim 1 further comprising the following steps:
   determining whether selecting one of the terminals directly and providing signals to the selected terminal when the electronic device is turned on or the sources change;
   determining whether manual or automatic addition of the weighting numbers to the sequence index of the selected terminal is selected when one terminal is selected; and
   adding the weighting numbers to the sequence indexes of the terminals automatically when the automatic addition is selected.

6. The signal detection method as claimed in claim 5 further comprising the following steps:
   Whether the manual or automatic addition of the weighting numbers determining whether the manual or automatic addition of the weighting numbers to the sequence index of the terminals is selected when no terminal is selected; and
   determining the detection sequence according to the sequence indexes when the manual addition is selected.

7. The signal detection method as claimed in claim 1, wherein the terminals comprise an analog signal terminal, a digital signal terminal and a video signal terminal.

8. A signal detection method for an electronic device comprising a first terminal receiving signals from a first source, a second terminal receiving signals from a second source, and a memory, comprising the following steps:
   assigning a first sequence index W1 to the first terminal and a second sequence index W2 to the second terminal;
   providing a first weighting number D1, a second weighting number D2 and a third weighting number D3 for the electronic device;
   adding the first weighting number D1 to the first sequence index W1 when the first terminal is connected to the first source and receives signals from the first source;
   adding the second weighting number D2 to the first sequence index W1 when the first terminal is connected to the first source without receiving signal;
   adding the third weighting number D3 to the first sequence index W1 when the first terminal is not connected to the first source;
   adding the first weighting number D1 to the second sequence index W2 when the second terminal is connected to the second source and receives the signals from the second source;
   adding the second weighting number D2 to the second sequence index W2 when the second terminal is connected to the second source but without receiving signal;
   adding the third weighting number D3 to the second sequence index W2 when the second terminal is not connected to the second source; and
   saving the first sequence index W1 and the second sequence index W2 to the memory,
   wherein when the electronic device turns off and on again, the electronic device detects the first terminal first if the first sequence index W1 is greater than the second sequence index W2, and the electronic device detects the second terminal first if the first sequence index W1 is less than the second sequence index W2.

9. The signal detection method as claimed in claim 6, wherein the first weighting number D1 is greater than the second weighting number D2, and the second weighting number D2 is greater than the third weighting number D3.

10. The signal detection method as claimed in claim 7 further comprising the following step:
   providing a fourth weighting number D4 having a value proportional a time period when the signals are received by one of the first terminal and the second terminal.

11. The signal detection method as claimed in claim 8 further comprising the following steps:
   determining whether the weighting numbers are manually or automatically added to one of the first sequence index W1 and the second sequence index W2 when the electronic device is turned on or the sources change; and
   determining a detection sequence according to the first and second sequence indexes W1 and W2 when manual addition is selected.

12. The signal detection method as claimed in claim 8 further comprising the following steps:
   determining whether one of the first terminal and the second terminal is a user pre-selected terminal and providing the signals to the user pre-selected terminal when the electronic device is turned on or the sources change;
   determining whether the weighting numbers are automatically added to the first sequence index W1 of the first terminal when the first terminal is pre-selected; and
   adding the weighting numbers to the first sequence index W1 of the first terminal automatically when automatic addition is selected.

13. The signal detection method as claimed in claim 12 further comprising the following steps:
   determining whether the weighting numbers are manually or automatically added to the first sequence index W1 or the second sequence index W2 is selected when no terminal is user pre-selected; and
   determining a detection sequence according to the first and second sequence indexes W1 and W2 when the manual addition is selected.

14. A signal detection method for an electronic device comprising a first terminal receiving signals from a first source, a second terminal receiving signals from a second source, and a memory, comprising the following steps:
   providing a first sequence index W1 for the first terminal and a second sequence index W2 for the second terminal;
   providing a first weighting number C1, a second weighting number C2, a third weighting number C3 and a fourth weighting number C4 for the electronic device;
   adding the first weighting number C1 to the first sequence index W1 when the first terminal receives the signals from the first source;
   adding the second weighting number C2 to the first sequence index W1 when the first terminal receives no signal;
   adding the third weighting number C3 to the second sequence index W2 when the second terminal receives the signals from the second source;
   adding the fourth weighting number C4 to the second sequence index W2 when the second terminal receives no signal, wherein C1>C2, C1>C4, C3>C2 and C3>C4;
   saving the first sequence index W1 and the second sequence index W2 to the memory, wherein when the electronic device turns off and on again, the electronic device detects the first terminal first if the first sequence index W1 is greater than the second sequence index W2, and the electronic device detects the second terminal first if the first sequence index W1 is less than the second sequence index W2;
   providing a fifth weighting number C5 and a sixth weighting number C6;

adding the fifth weighting number C5 to the first sequence index W1 when the first terminal is connected to the first source and receives no signal; and adding the sixth weighting number C6 to the second sequence index W2 when the second terminal is connected to the second source and receives no signal.

15. The signal detection method as claimed in claim 14 further comprising the following steps:

providing a seventh weighting number C7 and an eighth weighting number C8;

adding the seventh weighting number C7 to the first sequence index W1 when the first terminal is not connected to the first source and receives no signal; and adding the eighth weighting number C8 to the second sequence index W2 when the second terminal is not connected to the second source and receives no signal.

16. The signal detection method as claimed in claim 14 further comprising the following steps:

determining whether the weighting numbers are manually or automatically added to one of the first sequence index W1 and the second sequence index W2 when the electronic device is turned on or the sources change; and determining a detection sequence according to the first and second sequence indexes W1 and W2 when manual addition is selected.

17. The signal detection method as claimed in claim 14 further comprising the following steps:

determining whether one of the first terminal and the second terminal is a user pre-selected terminal and providing the signals to the user pre-selected terminal when the electronic device is turned on or the sources change;

determining whether the weighting numbers are manually or automatically added to the first sequence index W1 of the first terminal when the first terminal is pre-selected; and adding the weighting numbers to the first sequence index W1 of the first terminal automatically when automatic addition is selected.

18. The signal detection method as claimed in claim 17 further comprising the following steps:

determining whether the weighting numbers are manually or automatically added to the first sequence index W1 or the second sequence index W2 when no terminal is pre-selected; and determining a detection sequence according to the first and second sequence indexes W1 and W2 when the manual addition is selected.

* * * * *